(12) United States Patent
Yoshikawa

(10) Patent No.: US 7,978,252 B2
(45) Date of Patent: Jul. 12, 2011

(54) IMAGING APPARATUS, IMAGING SYSTEM, AND IMAGING METHOD

(75) Inventor: Seiji Yoshikawa, Tokyo (JP)

(73) Assignee: Kyocera Corporation, Kyoto (JP)

( * ) Notice: Subject to any disclaimer, the term of this patent is extended or adjusted under 35 U.S.C. 154(b) by 947 days.

(21) Appl. No.: 11/909,789

(22) PCT Filed: Mar. 29, 2006

(86) PCT No.: PCT/JP2006/306477
§ 371 (c)(1),
(2), (4) Date: Sep. 26, 2007

(87) PCT Pub. No.: WO2006/106736
PCT Pub. Date: Oct. 12, 2006

(65) Prior Publication Data
US 2010/0182485 A1    Jul. 22, 2010

(30) Foreign Application Priority Data

Mar. 30, 2005  (JP) ................................. 2005-100129
Jul. 27, 2005   (JP) ................................. 2005-217803

(51) Int. Cl.
H04N 5/232 (2006.01)
H04N 5/225 (2006.01)
G01J 4/00 (2006.01)
(52) U.S. Cl. ......................... 348/345; 348/335; 356/364
(58) Field of Classification Search .................. 348/345, 348/335; 356/364–370
See application file for complete search history.

(56) References Cited

U.S. PATENT DOCUMENTS

| 4,834,539 A | * | 5/1989 | Le Bris et al. | ................ 356/369 |
| 5,241,372 A | * | 8/1993 | Ohba | ............................. 348/578 |
| 5,905,530 A | * | 5/1999 | Yokota et al. | ............. 348/240.99 |
| 6,021,005 A |   | 2/2000 | Cathey, Jr. et al. | ............ 359/737 |

(Continued)

FOREIGN PATENT DOCUMENTS

JP     2000-005127     1/2000

(Continued)

OTHER PUBLICATIONS

Japanese language office action and its English language translation for corresponding Japanese application 2005217803 lists the references above.

(Continued)

*Primary Examiner* — Lin Ye
*Assistant Examiner* — Amy Hsu
(74) *Attorney, Agent, or Firm* — DLA Piper LLP (US)

(57) ABSTRACT

An imaging apparatus, imaging system, and imaging method enabling restoration of image according to a plurality of optical systems by one apparatus, having a plurality of imaging apparatuses 100A to 100C each having an optical system 110, phase plate (optical wavefront modulation element) 120, imaging element 130 able to capture an object aberration image passing through the optical system 110 and phase plate 120, imaging apparatus side storage portion 140 storing coefficient specifying information for specifying a convolution coefficient, and transmission device 150 transmitting object aberration image data obtained from the imaging element 130 and the coefficient specifying information stored in the storage portion 140; and a processing device 200 acquiring one coefficient from among a plurality of convolution coefficients stored in advance based on coefficient specifying information in accordance with a zoom position or zoom amount transmitted from the imaging apparatus 100, and generating dispersion-free object image data from a dispersed image signal from the imaging element 130.

11 Claims, 15 Drawing Sheets

STATE OF LIGHT BEAMS ACCORDING TO OPTICAL SYSTEM

U.S. PATENT DOCUMENTS

| | | | |
|---|---|---|---|
| 6,069,738 A | 5/2000 | Cathey, Jr. et al. | 359/558 |
| 6,241,656 B1 | 6/2001 | Suga | 600/109 |
| 6,525,302 B2 * | 2/2003 | Dowski et al. | 250/201.2 |
| 6,642,504 B2 | 11/2003 | Cathey | 250/216 |
| 6,765,617 B1 * | 7/2004 | Tangen et al. | 348/340 |
| 7,303,280 B2 * | 12/2007 | Olivier et al. | 351/206 |
| 2004/0057089 A1 * | 3/2004 | Voelkl | 359/1 |
| 2007/0268376 A1 * | 11/2007 | Yoshikawa et al. | 348/222.1 |

FOREIGN PATENT DOCUMENTS

| | | |
|---|---|---|
| JP | 2000005127 A | 1/2000 |
| JP | 2003-219357 | 7/2003 |
| JP | 2003219357 A | 7/2003 |
| JP | 2003-235794 | 8/2003 |
| JP | 2003235794 A | 8/2003 |

OTHER PUBLICATIONS

Edward R. Dowski, Jr. et al. "Wavefront Coding: jointly optimized and digital imaging system", CDM Optics, Inc and Army Research Laboratory, edd@cdm-optics.com, 2000.

Edward R. Dowski, Jr. et al. Wavefront Coding: A modern method of achieving high performance and/or low cost imaging system:, CDM Optics, Inc., edd@cdm-optics.com, 1999.

* cited by examiner

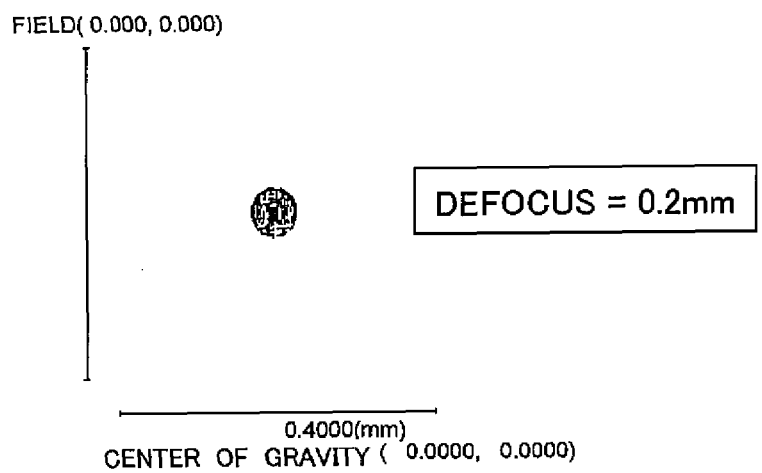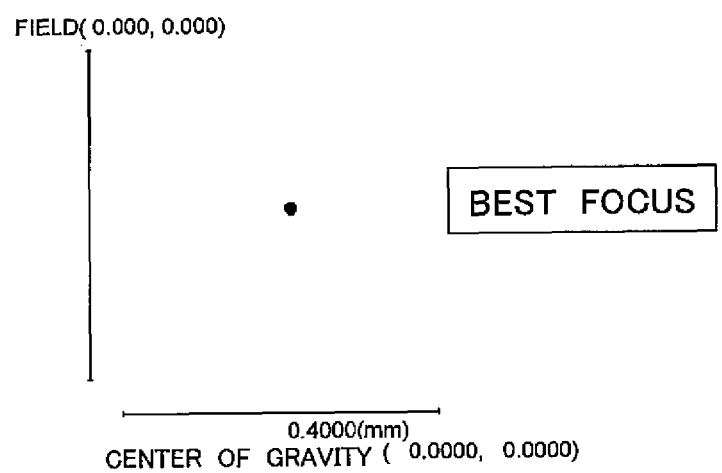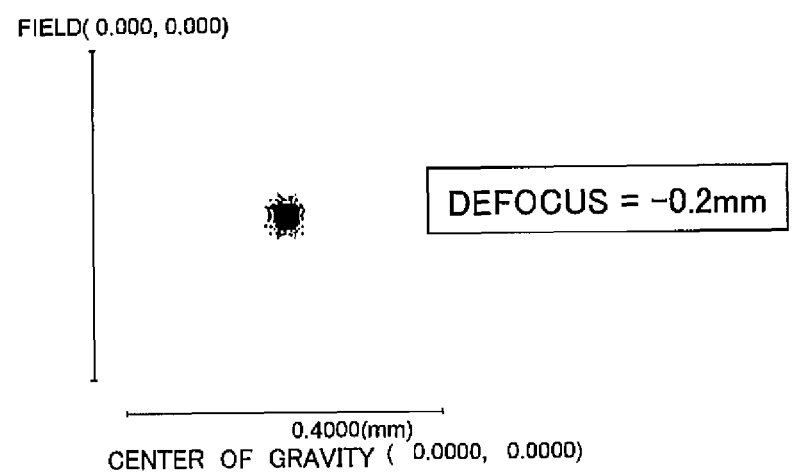

DEFOCUS = 0.2mm

FIELD(0.000, 0.000)
100.00

BEST FOCUS

FIELD(0.000, 0.000)
100.00

DEFOCUS = -0.2mm

FIELD(0.000, 0.000)
100.00

IMAGING APPARATUS, IMAGING SYSTEM, AND IMAGING METHOD

TECHNICAL FIELD

The present invention relates to an imaging apparatus, imaging system, and imaging method which can be applied to a digital still camera, a camera mounted in a mobile phone, a camera mounted in a personal digital assistant, or the like using an imaging element and provided with a zoom optical system.

BACKGROUND ART

In recent years, rapid advances have been made in digitalization of information. This has led to remarkable efforts to meet with this in the imaging field.

In particular, as symbolized by the digital camera, in imaging surfaces, film is being taken over by use of solid-state imaging elements such as CCDs (Charge Coupled Devices) or CMOS (Complementary Metal Oxide Semiconductor) sensors in most cases.

An imaging lens device using a CCD or CMOS sensor for the imaging element in this way optically captures the image of an object by the optical system and extracts the image as an electric signal by the imaging element. Other than a digital still camera, this is used in a video camera, a digital video unit, a personal computer, a mobile phone, a personal digital assistant (PDA), and so on.

FIG. 1 is a diagram schematically showing the configuration of a general imaging lens device and a state of light beams.

This imaging lens device 1 has an optical system 2 and a CCD or CMOS sensor or other imaging element 3.

The optical system includes object side lenses 21 and 22, a stop 23, and an imaging lens 24 sequentially arranged from the object side (OBJS) toward the imaging element 3 side.

In the imaging lens device 1, as shown in FIG. 1, the best focus surface is made to match with the imaging element surface.

FIG. 2A to FIG. 2C show spot images on a light receiving surface of the imaging element 3 of the imaging lens device 1.

Further, imaging apparatuses using phase plates (wavefront coding optical elements) to regularly disperse the light beams, using digital processing to restore the image, and thereby enabling capture of an image having a deep depth of field and so on have been proposed (see for example Non-patent Documents 1 and 2 and Patent Documents 1 to 5).

Non-patent Document 1: "Wavefront Coding; jointly optimized optical and digital imaging systems", Edward R. Dowski, Jr., Robert H. Cormack, Scott D. Sarama.

Non-patent Document 2: "Wavefront Coding; A modern method of achieving high performance and/or low cost imaging systems", Edward R. Dowski, Jr., Gregory E. Johnson.

Patent Document 1: U.S. Pat. No. 6,021,005
Patent Document 2: U.S. Pat. No. 6,642,504
Patent Document 3: U.S. Pat. No. 6,525,302
Patent Document 4: U.S. Pat. No. 6,069,738
Patent Document 5: Japanese Patent Publication (A) No. 2003-235794

DISCLOSURE OF THE INVENTION

Problem to be Solved by the Invention

All of the imaging apparatuses proposed in the documents explained above are predicated on a PSF (Point-Spread-Function) being constant when inserting the above phase plate in the usual optical system. If the PSF changes, it is extremely difficult to realize an image having a deep depth of field by convolution using the subsequent kernels.

Accordingly, leaving aside the case of lenses with a single focal point, in the lens of the zoom system, a high level of precision of the optical design and the accompanying increase in costs causes a major problem in adoption of this.

In other words, in a general imaging apparatus, suitable convolution processing is not possible. An optical design eliminating the astigmatism, coma aberration, zoom chromatic aberration, and other aberration causing deviation of the spot image at the time of the "wide" mode and at the time of the "tele" mode is required.

However, optical design eliminating these aberrations increases the difficulty of the optical design and induces problems such as an increase of the number of design processes, an increase of the costs, and an increase in size of the lenses.

As a result, one phase plate and one image restoration are required with respect to one optical system, control of a plurality of optical systems by one image restoration is regarded to be impossible, and concerning an apparatus which needs a plurality of optical systems in terms of system, there is a big problem in adoption due to an increase of cost and an increase of the system.

An object of the present invention is to provide an imaging apparatus, imaging system, and imaging method able to obtain a high definition image quality and in addition able to simplify the optical system, enabling cost reduction, enabling lens design without regard as to the zoom position or zoom amount, and enabling image restoration by high precision processing and in addition able to perform the image restoration of a plurality of optical systems by one apparatus.

Means for Solving the Problem

An imaging system according to a first aspect of the present invention has an imaging apparatus and a processing device, wherein the imaging apparatus includes an imaging element able to capture an object aberration image passing through an optical system and an optical wavefront modulation element, a convolution coefficient specifying information providing portion providing coefficient specifying information for specifying the convolution coefficient, and a transmission portion transmitting object aberration image data obtained from the imaging element and the coefficient specifying information provided by the convolution coefficient specifying information providing portion, and the processing device includes a reception portion receiving the object aberration image data and the coefficient specifying information transmitted by the transmission portion of the imaging apparatus, a processing device side storage portion storing a plurality of convolution coefficients, a coefficient selection portion selecting one convolution coefficient from the processing device side storage portion based on the coefficient specifying information received by the reception portion, and a conversion portion generating object image data free from aberration by converting the object aberration image data received by the reception portion by the one convolution coefficient selected at the coefficient selection portion.

An imaging apparatus according to a second aspect of the present invention includes an imaging element able to capture an object aberration image passing through an optical system and an optical wavefront modulation element, a convolution coefficient specifying information providing portion providing coefficient specifying information for specifying the convolution coefficient, and a transmission portion transmitting object aberration image data obtained from the imaging element and the coefficient specifying information provided by the convolution coefficient specifying information providing portion.

Preferably, the convolution coefficient specifying information providing portion includes an imaging apparatus side storage portion storing coefficient specifying information for specifying the convolution coefficient, and the transmission portion transmits the object aberration image data obtained from the imaging element and the coefficient specifying information stored in the storage portion.

Preferably, the optical system can selectively mount a plurality of lenses, the convolution coefficient specifying information providing portion includes a coefficient specifying information acquisition portion acquiring coefficient specifying information for specifying the convolution coefficient in accordance with the mounted lens, and the imaging element can capture an object aberration image passing through at least one lens among the plurality of lenses and the optical wavefront modulation element, and the transmission portion transmits the object aberration image data obtained from the imaging element and the coefficient specifying information acquired by the coefficient specifying information acquisition portion.

Preferably, the optical system includes a zoom optical system, the convolution coefficient specifying information providing portion includes an imaging apparatus side storage portion storing a plurality of coefficient specifying information able to specify the convolution coefficient in accordance with the zoom amount of the zoom optical system, a zoom amount detection portion detecting the zoom amount of the zoom optical system, and a coefficient specifying information acquisition portion acquiring one coefficient specifying information from the imaging apparatus side storage portion based on the zoom amount detected by the zoom amount detection portion, the imaging element can capture an object aberration image passing through the zoom optical system and the optical wavefront modulation element, and the transmission portion transmits the object aberration image data obtained from the imaging element and the coefficient specifying information acquired by the coefficient specifying information acquisition portion.

Preferably, the convolution coefficient specifying information providing portion includes an object distance information acquisition portion acquiring information corresponding to a distance up to the object, an imaging apparatus side storage portion storing a plurality of coefficient specifying information able to specify the convolution coefficient in accordance with the distance up to the object, and a coefficient specifying information acquisition portion acquiring one coefficient specifying information from the imaging apparatus side storage portion based on the information corresponding to the distance up to the object acquired by the object distance information acquisition portion, and the transmission portion transmits the object aberration image data obtained from the imaging element and the coefficient specifying information acquired by the coefficient specifying information acquisition portion.

An imaging method according to a third aspect of the present invention includes a step of capturing an object aberration image passing through an optical system and an optical wavefront modulation element by an imaging element, a step of transmitting object aberration image data and coefficient specifying information for specifying the convolution coefficient, a step of receiving the transmitted object aberration image data and the coefficient specifying information, a coefficient selection step of selecting one convolution coefficient from among a plurality of convolution coefficients based on the received coefficient specifying information, and a step of generating object image data free from aberration by converting the received object aberration image data by the one convolution coefficient selected in the coefficient selection step.

Effect of the Invention

According to the present invention, it is possible to obtain a high definition image quality and in addition restorations of a plurality of optical systems can be carried out by one apparatus.

BRIEF DESCRIPTION OF THE DRAWINGS

FIG. 2A to FIG. 2C are diagrams showing spot images on a light receiving surface of an imaging element of the imaging lens device of FIG. 1, in which FIG. 2A is a diagram showing a spot image in a case where a focal point is deviated by 0.2 mm (defocus=0.2 mm), FIG. 2B is a diagram showing a spot image in a case of focus (best focus), and FIG. 2C is a diagram showing a spot image in a case where the focal point is deviated by −0.2 mm (defocus=−0.2 mm).

FIG. 12A to FIG. 12C are diagrams showing spot images on the light receiving surface of an imaging element of an imaging lens device according to the present embodiment, in which FIG. 12A is a diagram showing a spot image in the case where the focal point is deviated by 0.2 mm (defocus=0.2 mm), FIG. 12B is a diagram showing a spot image in the case of focus (best focus), and FIG. 12C is a diagram showing a spot image in the case where the focal point is deviated by −0.2 mm (defocus=−0.2 mm).

FIG. 13A and FIG. 13B are diagrams for explaining an MTF of a first order image formed by an imaging lens device according to the present embodiment, in which FIG. 13A is a diagram showing a spot image on the light receiving surface of an imaging element of an imaging lens device, and FIG. 13B shows an MTF characteristic with respect to a spatial frequency.

DESCRIPTION OF NOTATIONS

100 . . . imaging apparatus, 110 . . . zoom optical system, 111 . . . object side lens, 112 . . . imaging lens, 113 . . . wavefront forming optical elements, 120 . . . phase plate (optical wavefront modulation element), 130 . . . imaging element, 140 . . . storage portion, 150 . . . transmission device, 160 . . . zoom information detection device, 200 . . . processing device, 210 . . . reception portion, 220 . . . reception information control unit, 230 . . . convolution device, 240 . . . kernel and/or numerical operational coefficient storage register, and 250 . . . image processing computation processor.

BEST MODE FOR CARRYING OUT THE INVENTION

Below, embodiments of the present invention will be explained with reference to the accompanying drawings.

Figure 1:
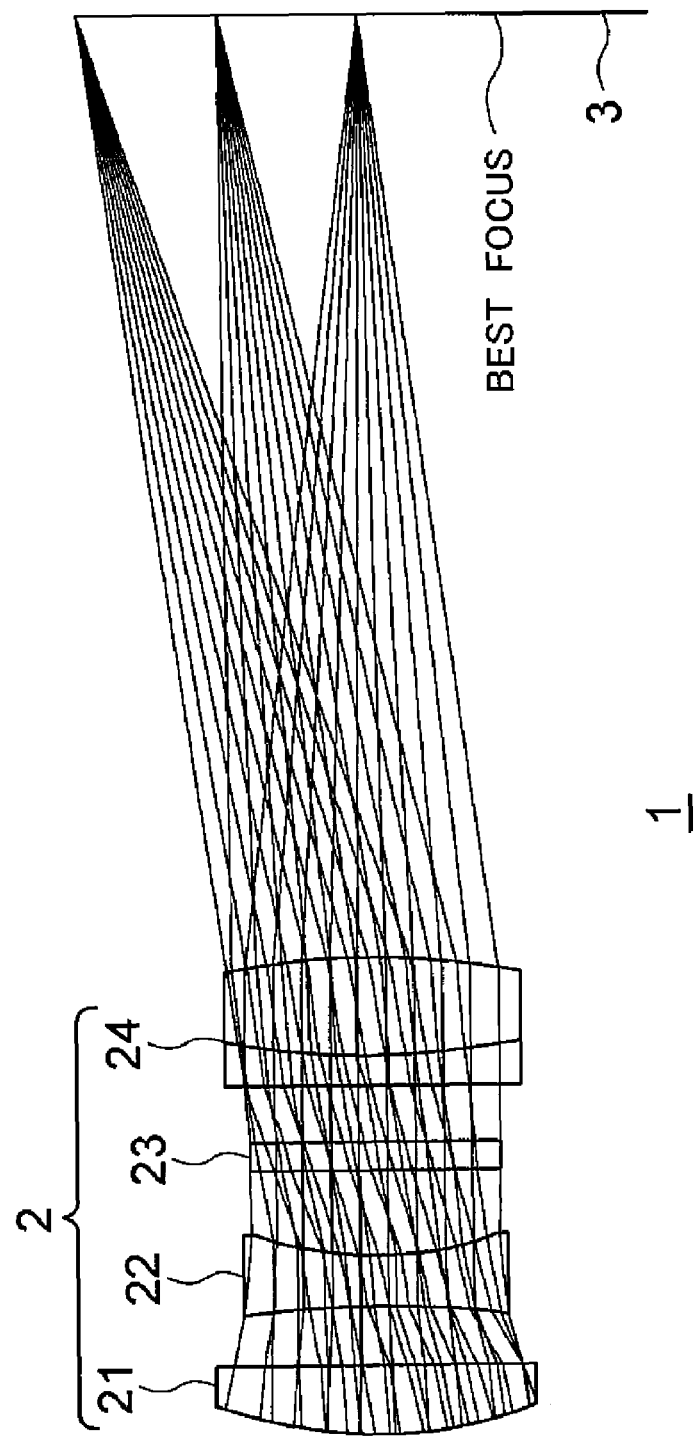
FIG. 1 is a diagram schematically showing the configuration of a general imaging lens device and a state of light beams.
Figure 3:
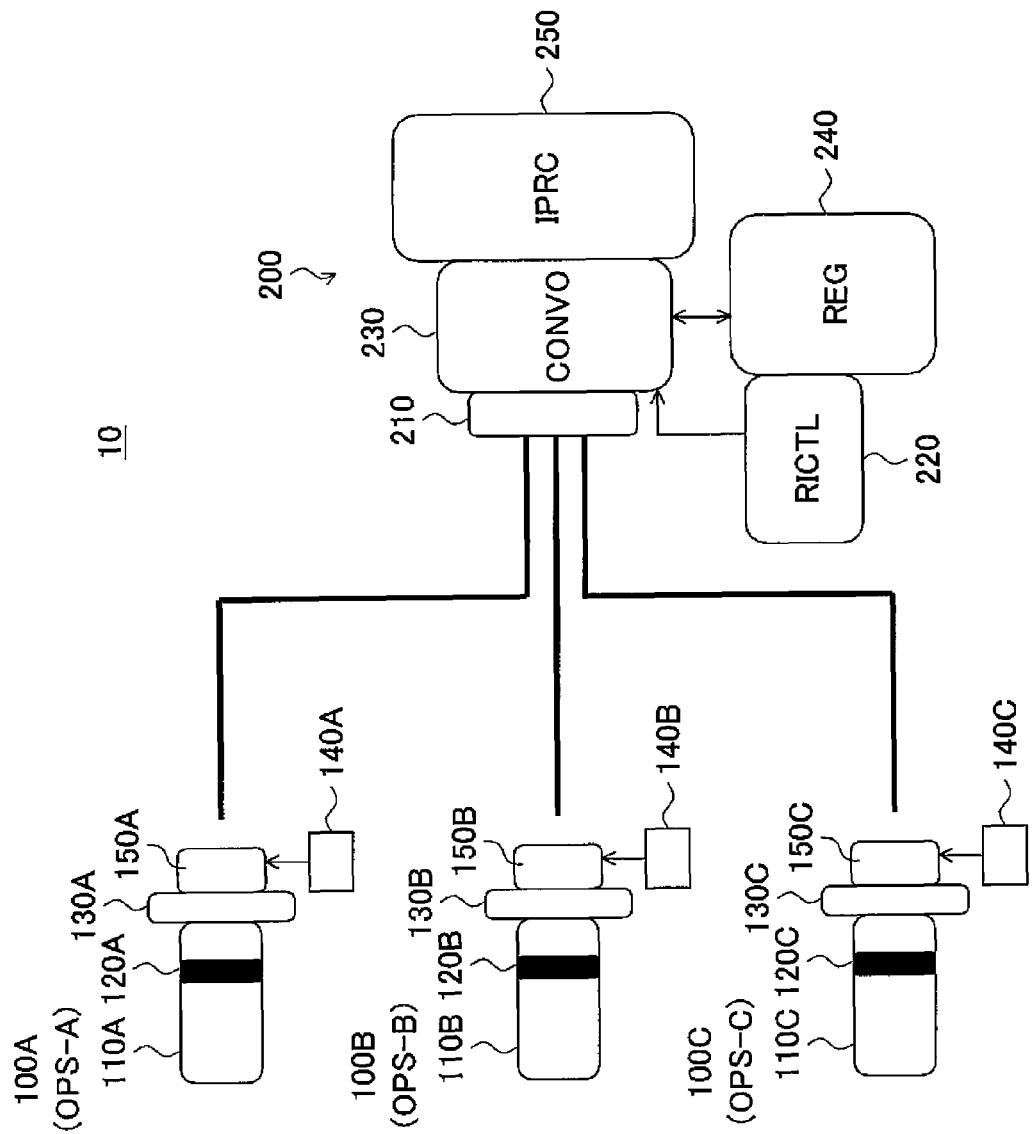
FIG. 3 is a view of the configuration of an imaging system according to the present embodiment.

FIG. 3 is a view of the configuration of an imaging system according to the present embodiment.

The imaging system 10, as shown in FIG. 3, has imaging apparatuses 100A, 100B, and 100C as a plurality of (in the present embodiment, three) optical systems OPS-A to OPS-C and a processing device 200.

Further, the imaging system 10 is configured so that the captured image data of the imaging apparatuses 100A, 100B, and 100C, type of the optical system, the zoom amount when capturing the image and schematic object distance information, and coefficient specifying information for specifying the convolution coefficient can be transmitted to the processing device 200 wirelessly or by wire.

The imaging apparatuses 100A, 100B, and 100C, basically as shown in FIG. 3, have for example optical systems 100 (A, B, C), phase plates 120 (A, B, C) as the optical wavefront modulation elements, imaging elements 130 (A, B, C) able to capture aberration images of the object passing through the optical systems 110 (A, B, C) and phase plates 120 (A, B, C), imaging apparatus side storage portions 140 (A, B, C) for storing coefficient specifying information for specifying convolution coefficients, and transmission devices 150 (A, B, C) for transmitting object aberration image data obtained from the imaging elements 130 (A, B, C) and coefficient specifying information stored in the storage portions 140 (A, B, C) as principal components.

Here, the imaging apparatus side storage portions 140 (A, B, C) function as convolution coefficient specifying information providing portions.

Figure 4:
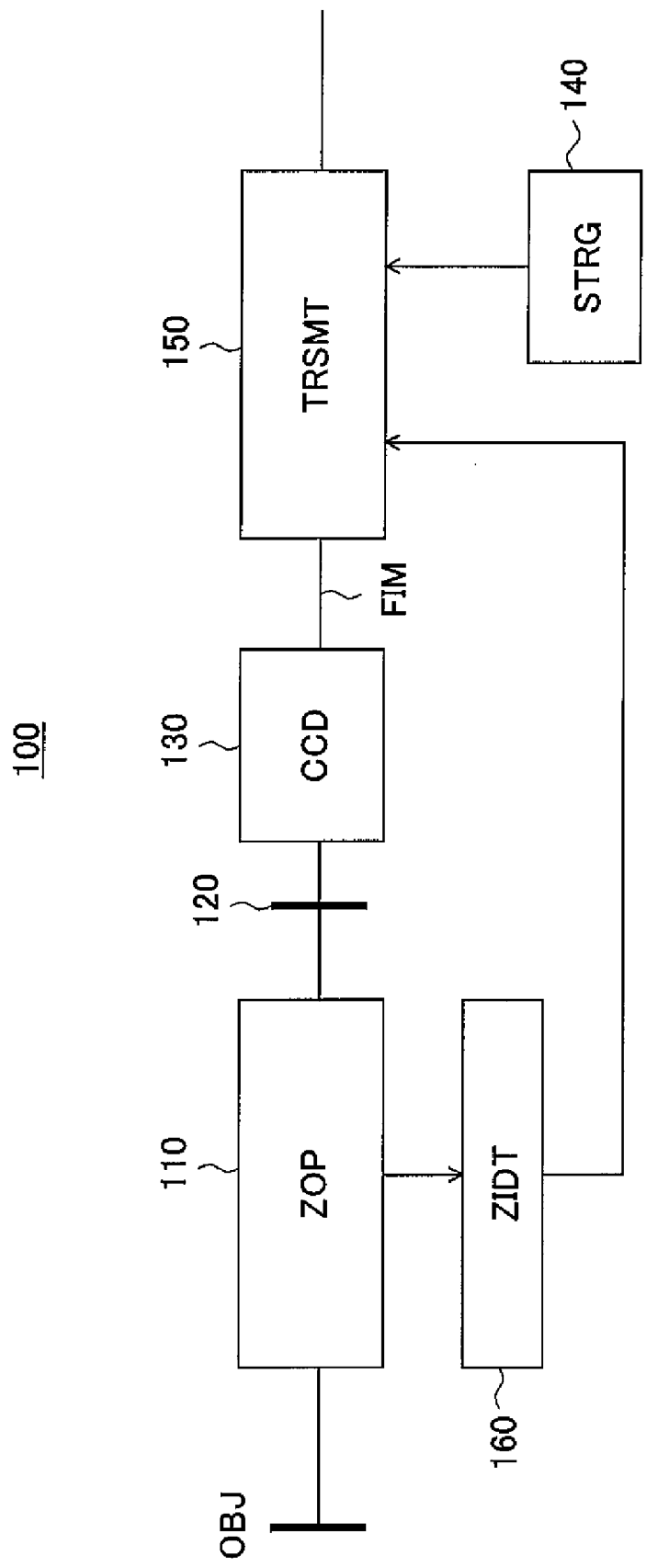
FIG. 4 is a block diagram showing a concrete example of the configuration of an imaging apparatus according to the present embodiment.

FIG. 4 is a block diagram showing a concrete configuration of the imaging apparatus according to the present embodiment. The imaging apparatus 100 of FIG. 4 is, in addition to the configuration of each imaging apparatus of FIG. 3, further provided with a zoom information detection device (ZIDT) 160 as the zoom amount detection portion.

The zoom optical system (ZOP) 110 optically captures an image of an imaging object (object) OBJ.

The imaging element 130 is formed by a CCD or CMOS sensor in which the image captured at the zoom optical system 110 including the phase plate 120 is imaged and which outputs an imaged first order image information as a first order image signal FIM of an electric signal to the transmission device 150. In FIG. 4, the imaging element 130 is described as a CCD as an example.

The transmission device (TRSMT) 150 functions as a portion of the coefficient specifying information acquisition portion for acquiring one coefficient specifying information from the storage portion (STRG) 140 based on the zoom amount detected by the zoom information detection device 160 and transmits the object aberration image data obtained from the imaging element 130 and the acquired coefficient specifying information to the processing device 200 wirelessly or by wire.

Here, the storage portion 140, zoom information detection device 160, and transmission device 150 serving as the coefficient specifying information acquisition portion function as the convolution coefficient specifying information providing portion.

Figure 5:
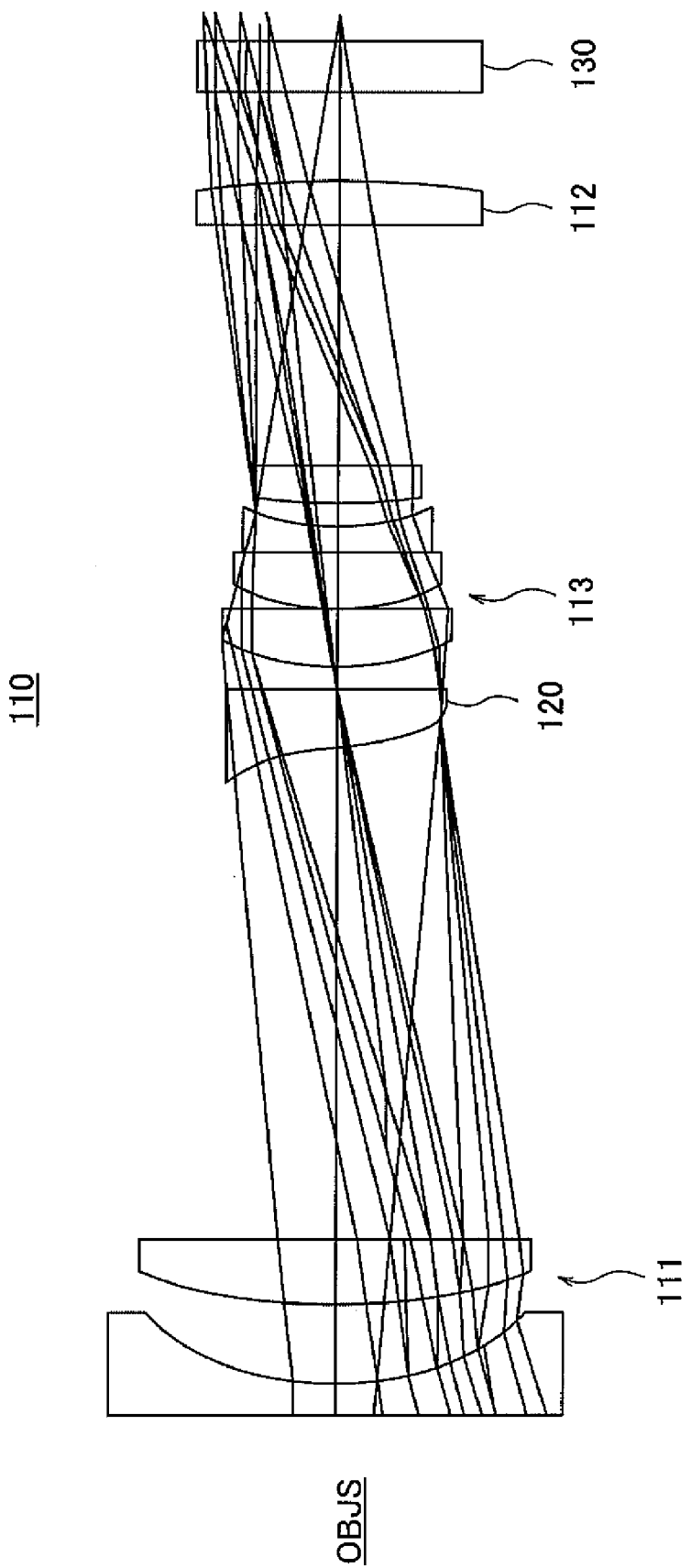
FIG. 5 is a diagram schematically showing an example of the configuration of a zoom optical system of an imaging lens device according to the present embodiment.

FIG. 5 is a diagram schematically showing an example of the configuration of the optical system of the zoom optical system 110 according to the present embodiment.

The zoom optical system 110 of FIG. 5 has an object side lens 111 arranged on the object side OBJS, an imaging lens 112 for forming an image in the imaging element 130, and an optical wavefront modulation element (wavefront coding optical element) group 113 arranged between the object side lens 111 and the imaging lens 112 and including a phase plate (cubic phase plate) deforming the wavefront of the image formed on the light receiving surface of the imaging element 130 by the imaging lens 112 and having for example a three-dimensional curved surface. Further, a not shown stop is arranged between the object side lens 111 and the imaging lens 112.

Note that, in the present embodiment, an explanation was given of the case where a phase plate was used, but the optical wavefront modulation elements of the present invention may include any elements so far as they deform the wavefront. They may include optical elements changing in thickness (for example, the above-explained third order phase plate), optical elements changing in refractive index (for example, a refractive index distribution type wavefront modulation lens), optical elements changing in thickness and refractive index by coding on the lens surface (for example, a wavefront coding hybrid lens), liquid crystal devices able to modulate the phase distribution of the light (for example, liquid crystal spatial phase modulation devices), and other optical wavefront modulation elements.

The zoom optical system 110 of FIG. 5 is an example of inserting an optical phase plate 120 into a 3× zoom system used in a digital camera.

The phase plate 120 shown in the figure is an optical lens regularly dispersing the light beams converged by the optical system. By inserting this phase plate, an image not focused anywhere on the imaging element 130 is realized.

In other words, the phase plate 120 forms light beams having a deep depth (playing a central role in the image formation) and a flare (blurred portion).

A system for restoring this regularly dispersed image to a focused image by digital processing will be referred to as a "wavefront aberration control optical system (wavefront coding optical system (WFCO))". This processing is carried out on the processing device 200 side of the destination.

Figure 6:
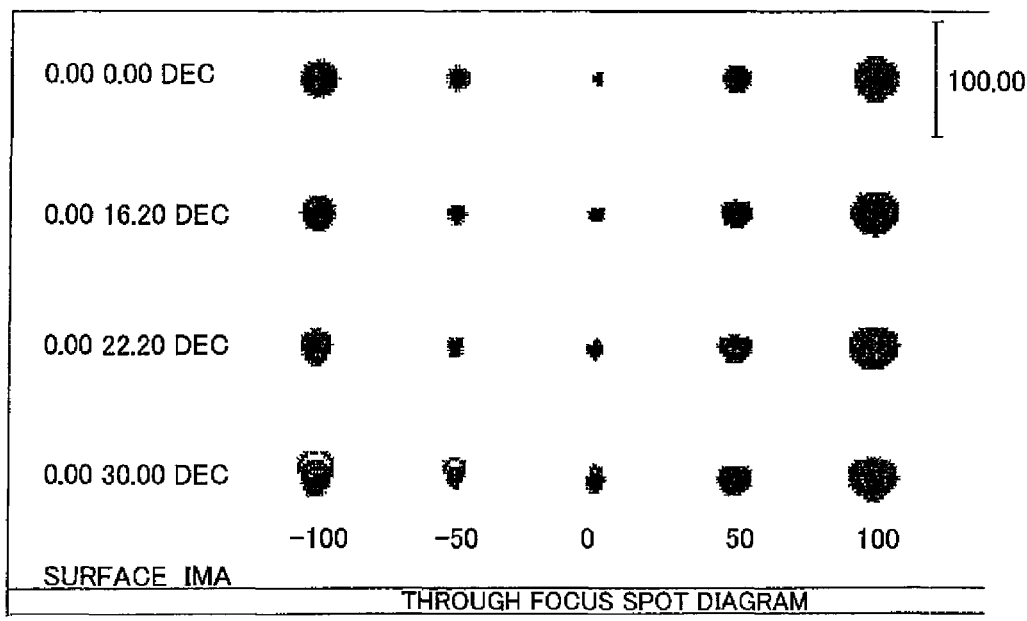
FIG. 6 is a diagram showing a spot image at the time of a wide mode of a zoom optical system not including a phase plate.
Figure 7:
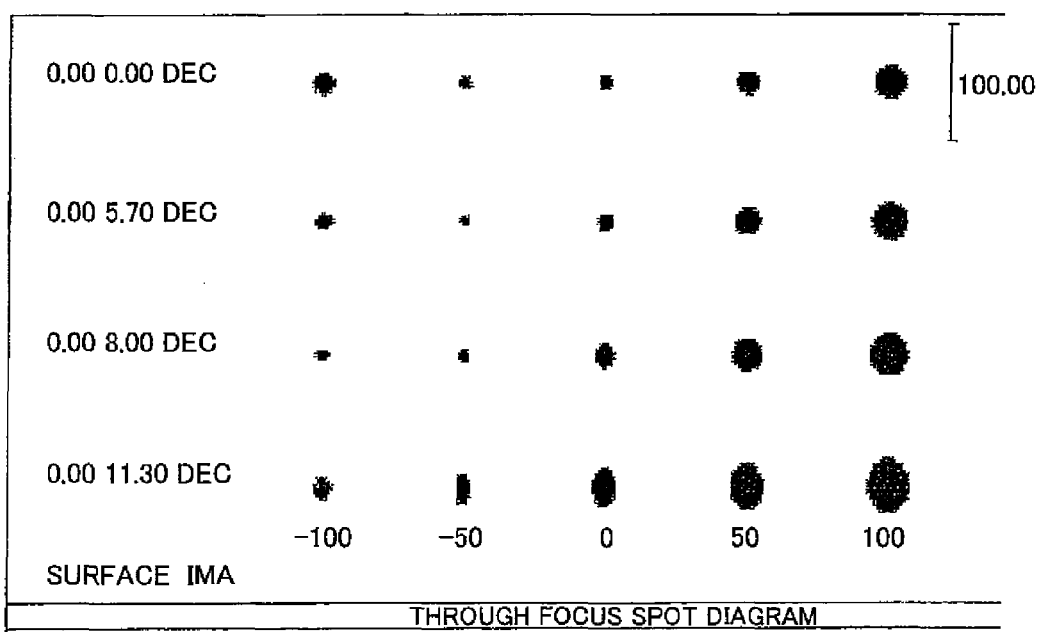
FIG. 7 is a diagram showing a spot image at the time of a tele mode of a zoom optical system not including a phase plate.
Figure 8:
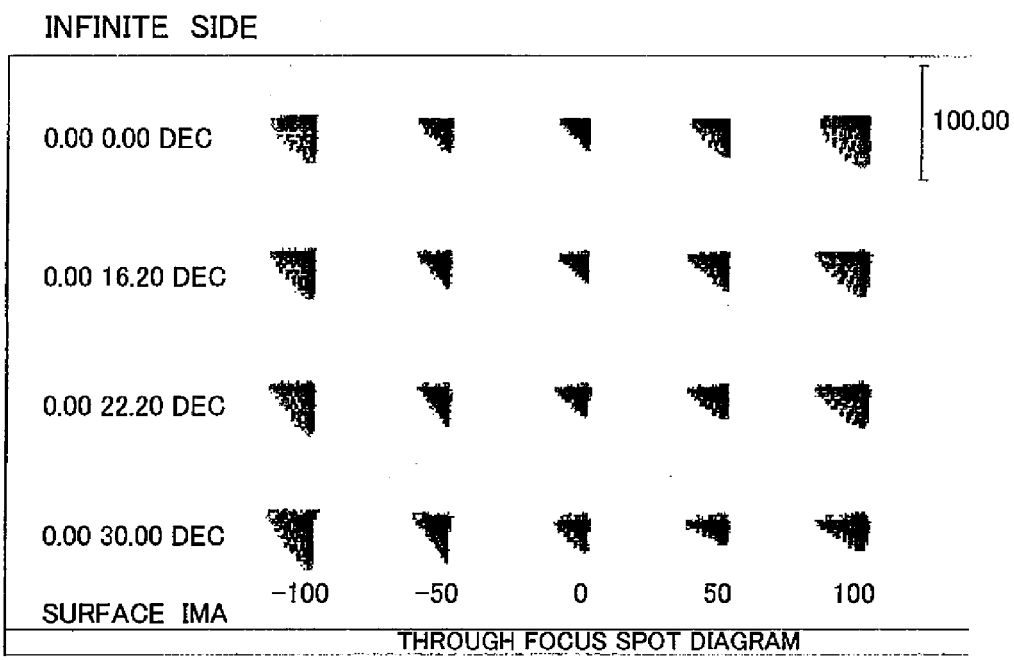
FIG. 8 is a diagram showing a spot image on an infinite side of a zoom optical system including a phase plate.
Figure 9:
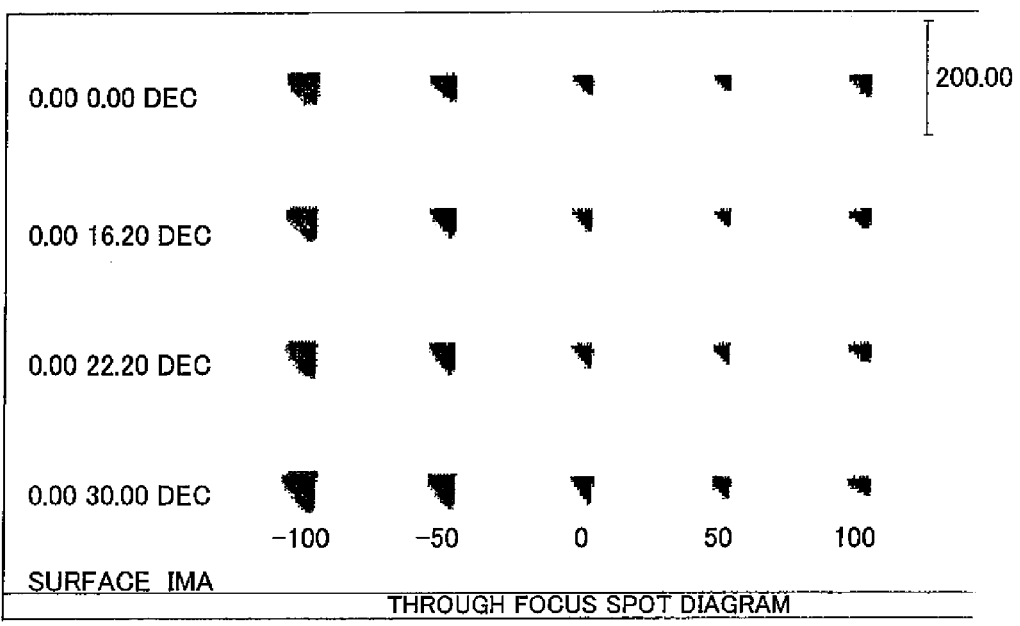
FIG. 9 is a diagram showing a spot image on a proximate side of a zoom optical system including a phase plate.

FIG. 6 is a diagram showing a spot image at the time of a wide mode of a zoom optical system 110 not including a phase plate. FIG. 7 is a diagram showing a spot image at the time of a tele mode of a zoom optical system 110 not including a phase plate. FIG. 8 is a diagram showing a spot image on the infinite side of a zoom optical system 110 including a phase plate. FIG. 9 is a diagram showing a spot image on the proximate side of a zoom optical system 110 including a phase plate.

Basically, the spot image of light passing through an optical lens system not including a phase plate, as shown in FIG. 6 and FIG. 7, differs between the case where the zoom optical system is in the wide mode and in the tele mode.

Naturally, as shown in FIG. 8 and FIG. 9, the spot image passed through the phase plate influenced by this spot image also differs between the infinite side and the proximate side.

In this type of optical system having a spot image differing according to the zoom position, an H function explained later is different.

Suitable convolution processing cannot be performed in a general imaging apparatus. Therefore, an optical design eliminating astigmatism, coma aberration, zoom chromatic aberration, and other aberration causing deviation of this spot image is required. An optical design for eliminating these aberrations increases the difficulty of the optical design and causes the problems of an increase of the number of design processes, a cost increase, and an increase of the size of the lenses.

Therefore, in the present embodiment, as shown in FIG. 4, at the point of time when the imaging apparatus (camera) 100 enters into the imaging state, the zoom position or zoom amount thereof is read out from the zoom information detection device 160, and the type of the optical system, the zoom amount at the time of the image capturing, and the coefficient specifying information for specifying the convolution coefficient are transmitted from the transmission device 150 to the processing device 200 wirelessly or by wire.

The processing device 200 acquires one coefficient from among a plurality of convolution coefficients stored in advance based on the specifying information in accordance with the transmitted zoom position or zoom amount and generates dispersion-free object image data from the dispersed image signal from the imaging element 130.

Note that, in the present embodiment, "dispersion" means the phenomenon where as explained above, inserting the phase plate 120 causes the formation of an image not focused anywhere on the imaging element 130 and the formation of light beams having a deep depth (playing a central role in the image formation) and flare (blurred portion) by the phase plate 120 and includes the same meaning as aberration because of the behavior of the image being dispersed and forming a blurred portion. Accordingly, in the present embodiment, there also exists a case where dispersion is explained as aberration.

The processing device 200, as shown in FIG. 3, has a reception portion 210, reception information control unit (RICTL) 220, convolution device (CONVO) 230, kernel and/or numerical operational coefficient storage register (REG) 240, and image processing computation processor (IPRC) 250.

Figure 10:
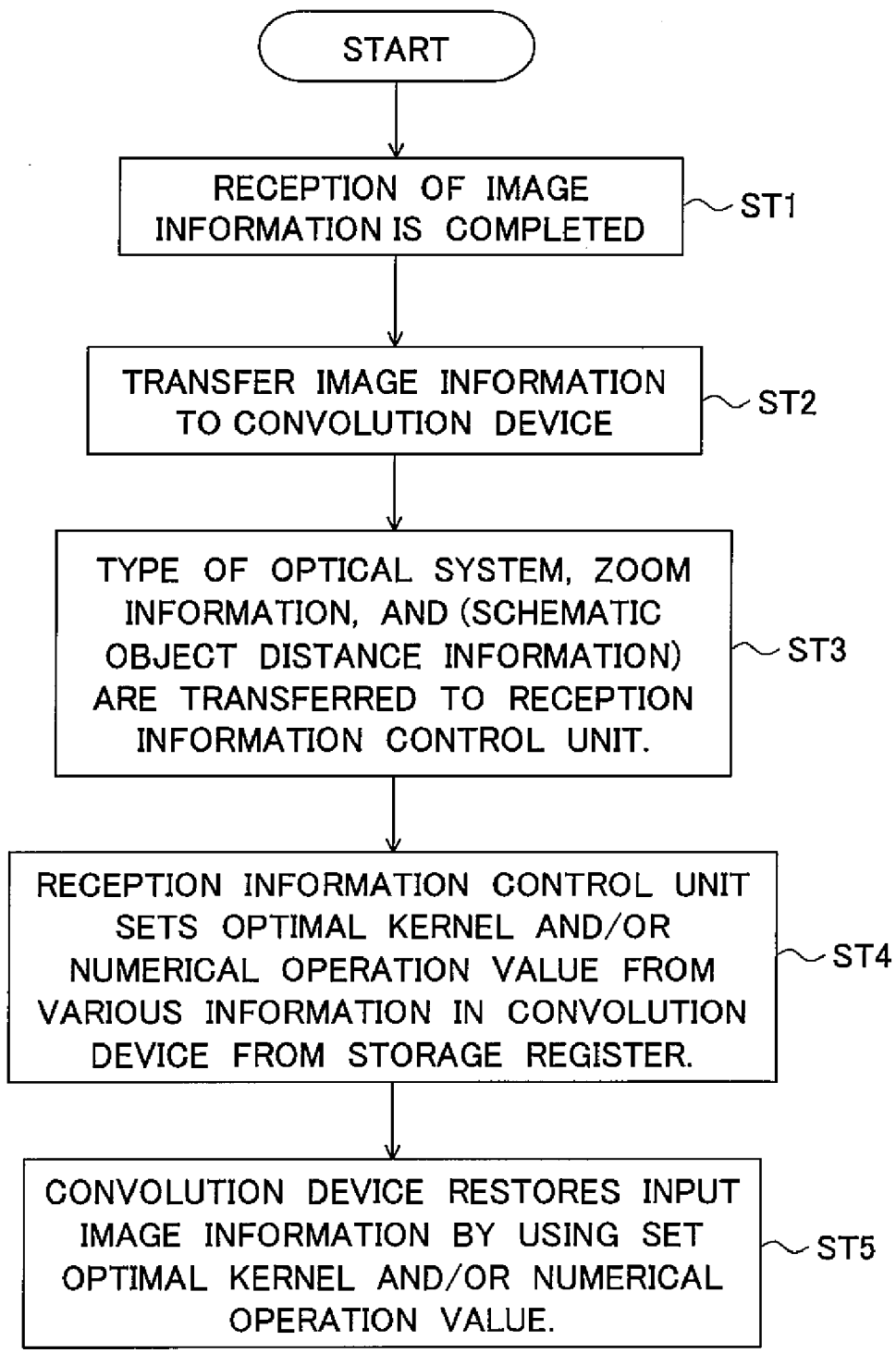
FIG. 10 is a flow chart showing an outline of processing of a processing device of the present embodiment.

FIG. 10 is a flow chart showing an outline of processing of a processing device 200 constituting the receiving side.

In this processing device 200, imaging apparatuses 100A to 100C constituting the plurality of optical systems are sequentially driven by the image processing computation processor 250. At that time, reception timings of the transmission information from the imaging apparatuses 100A to 100C by the reception portion 210 are controlled so that transfers of images captured by the imaging apparatuses 100A to 100C do not overlap in the reception portion 210.

Next, a single optical system instructed to capture the image, for example the imaging apparatus 100A, captures the image information and transfers the image information to the transmission device 150.

The transmission device 150 to which the image information is transferred adds the image information, type of optical system (AorBorC), zoom information at the time of the image capture, schematic object distance information at the time of the image capture, and other information (coefficient specifying information) serving as factors for determination of the optimal value in the kernel and/or numerical operational coefficient storage register 240, and transmits the data to the reception portion 210 wirelessly or by wire.

The reception portion 210 receiving the information transfers the information serving as factors for determining the optimal value to the reception information control unit 220 (ST1 to ST3).

This reception information control unit 220 sets the optimal value in the convolution device 230 by the kernel and/or numerical operational coefficient storage register 240 (ST4).

The convolution device 230 performs the optimum restoration of the image by using the captured image information and the kernel and/or numerical operation value constituting the set optimal value (ST5).

Here, the basic principle of WFCO will be explained.

Figure 11:
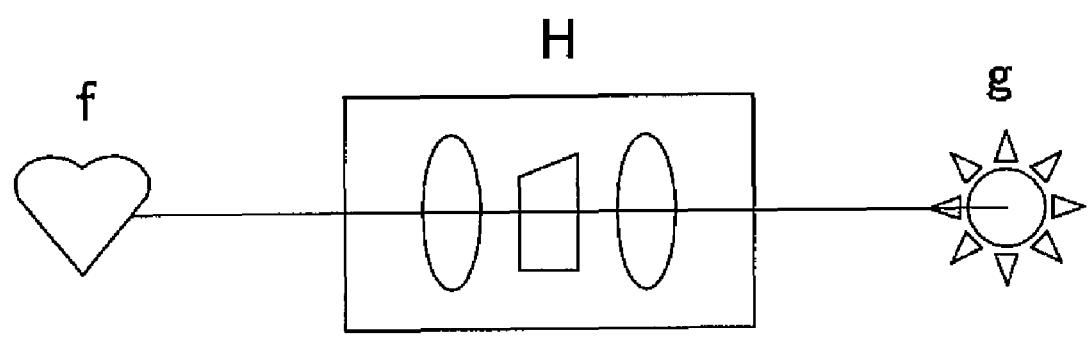
FIG. 11 is a diagram for explaining a principle of WFCO.

As shown in FIG. 11, an image f of the object enters into the WFCO optical system H, whereby a g image is generated.

This can be represented by the following equation.

$$g = H * f \tag{Equation 1}$$

where, * indicates convolution.

In order to find the object from the generated image, the next processing is required.

$$f = H^{-1} * g \tag{Equation 2}$$

Here, the kernel size and operational coefficients concerning the function H will be explained.

Assume that the individual zoom positions are Zpn, Zpn-1, . . . .

Assume that the H functions thereof are Hn, Hn-1, . . . .

The spots are different, therefore the H functions become as follows.

$$Hn = \begin{pmatrix} a & b & c \\ d & e & f \end{pmatrix}$$

$$Hn-1 = \begin{pmatrix} a' & b' & c' \\ d' & e' & f' \\ g' & h' & i' \end{pmatrix} \quad [\text{Equation 3}]$$

The difference of the number of rows and/or the number of columns of this matrix is referred to as the "kernel size". Each figure is used as an operational coefficient.

As explained above, when using a phase plate as the optical wavefront modulation optical element in an imaging apparatus provided in a zoom optical system, the generated spot image differs according to the zoom position of the zoom optical system. For this reason, when performing the convolution operation of a focal point deviated image (spot image) obtained by the phase plate in a later DSP etc., in order to obtain the suitable focused image, convolution operation differing in accordance with the zoom position becomes necessary.

Therefore, the present embodiment is configured provided with the zoom information detection device 160, performing a suitable convolution operation in accordance with the zoom position, and obtaining a suitable focused image without regard as to the zoom position.

As described above, for a suitable convolution operation in the processing device 200, it is possible to configure the system to store operational coefficients of convolution in the register 240.

Other than this configuration, it is also possible to employ the following configurations.

It is possible to employ a configuration storing in advance a correction coefficient in the register 240 in accordance with each zoom position, correcting the operational coefficient by using this correction coefficient, and performing a suitable convolution operation by the corrected operational coefficient, a configuration storing in advance the kernel size and the operational coefficient per se of the convolution in the register 240 in accordance with each zoom position and performing a convolution operation by these stored kernel size and operational coefficient, a configuration storing in advance the operational coefficient in accordance with the zoom position as a function in the register 240, finding the operational coefficient by this function according to the zoom position, and performing a convolution operation by the computed operational coefficient, and so on.

In the present embodiment, WFCO is employed, and it is possible to obtain a high definition image quality. In addition, the optical system can be simplified, and the cost can be reduced.

Below, these characteristic features will be explained.

Figure 12A:
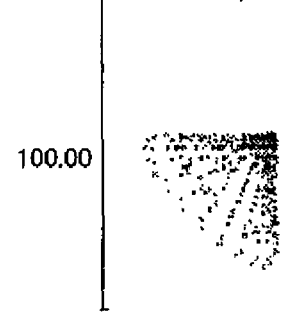
Figure 12B:
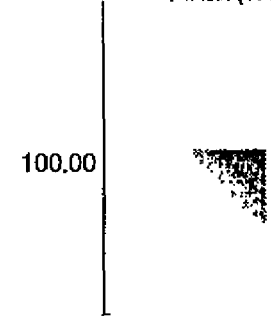
Figure 12C:
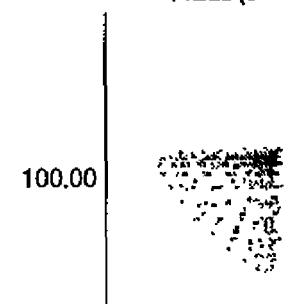

FIG. 12A to FIG. 12C show spot images on the light reception surface of the imaging element 130 of the imaging apparatus 100.

FIG. 12A is a diagram showing a spot image in the case where the focal point is deviated by 0.2 mm (defocus=0.2 mm), FIG. 12B is a diagram showing a spot image in the case of focus (best focus), and FIG. 12C is a diagram showing a spot image in the case where the focal point is deviated by −0.2 mm (defocus=−0.2 mm).

As seen also from FIG. 12A to FIG. 12C, in the imaging apparatus 100 according to the present embodiment, light beams having a deep depth (playing a central role in the image formation) and a flare (blurred portion) are formed by the wavefront forming optical element group 113 including the phase plate 120.

In this way, the first order image FIM formed in the imaging apparatus 100 of the present embodiment is given light beam conditions resulting in deep depth.

Figure 13A:
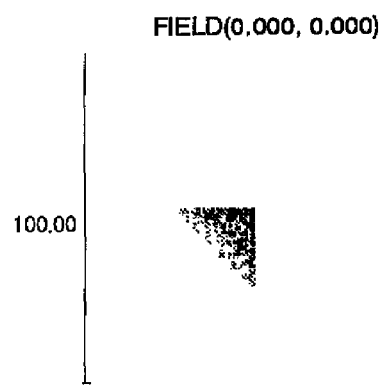
Figure 13B:
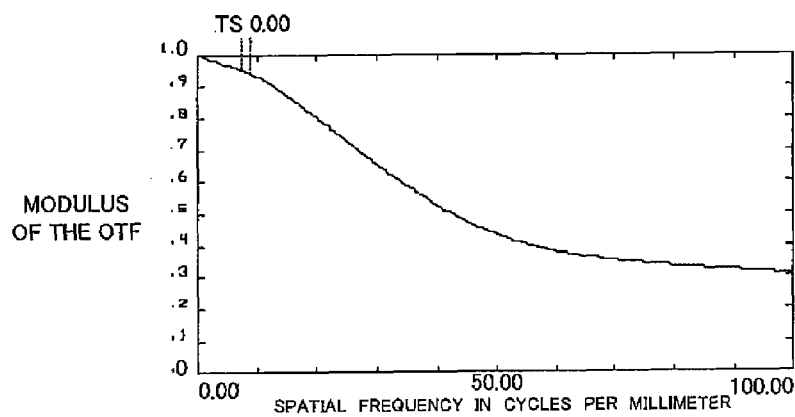

FIG. 13A and FIG. 13B are diagrams for explaining a modulation transfer function (MTF) of the first order image formed by the imaging lens device according to the present embodiment, in which FIG. 13A is a diagram showing a spot image on the light receiving surface of the imaging element of the imaging lens device, and FIG. 13B shows the MTF characteristic with respect to the spatial frequency Sfreq.

In the present embodiment, the high definition final image is left to the correction processing of the latter stage image processing device 300 configured by, for example, a digital signal processor. Therefore, as shown in FIG. 13A and FIG. 13B, the MTF of the first order image essentially becomes a low value.

The processing device 200 is configured by for example a DSP and, as explained above, receives the first order image FIM from the imaging apparatus 100, applies predetermined correction processing etc. for boosting the MTF at the spatial frequency Sfreq of the first order image, and forms a high definition final image FNLIM.

Figure 14:
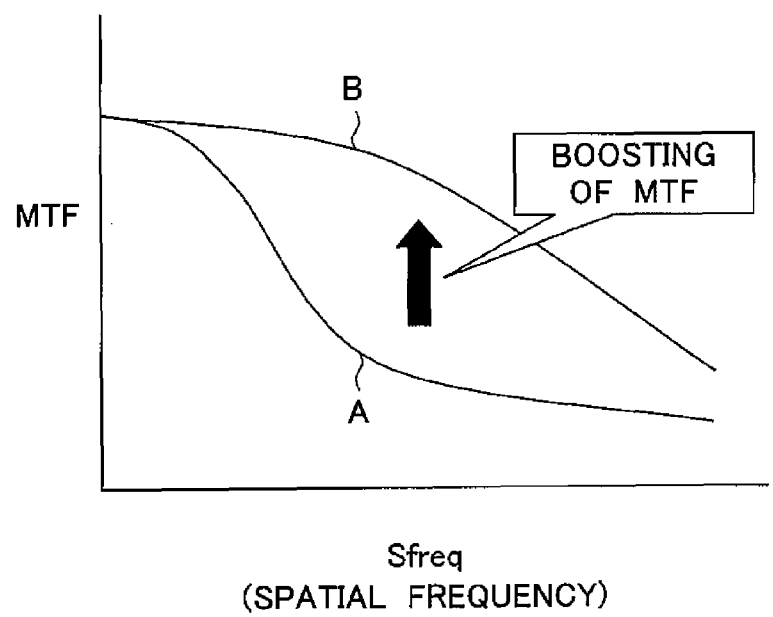
FIG. 14 is a diagram for explaining MTF correction processing in a processing device according to the present embodiment.

The MTF correction processing of the processing device 200 performs correction so that, for example as indicated by a curve A of FIG. 14, the MTF of the first order image which essentially becomes a low value approaches (reaches) the characteristic indicated by a curve B in FIG. 14 by post-processing such as edge enhancement and chroma enhancement by using the spatial frequency Sfreq as a parameter.

The characteristic indicated by the curve B in FIG. 14 is the characteristic obtained in the case where the wavefront forming optical element is not used and the wavefront is not deformed as in for example the present embodiment.

Note that all corrections in the present embodiment are according to the parameter of the spatial frequency Sfreq.

In the present embodiment, as shown in FIG. 14, in order to achieve the MTF characteristic curve B desired to be finally realized with respect to the MTF characteristic curve A for the optically obtained spatial frequency Sfreq, the strength of the edge enhancement etc. is adjusted for each spatial frequency to correct the original image (first order image).

Figure 15:
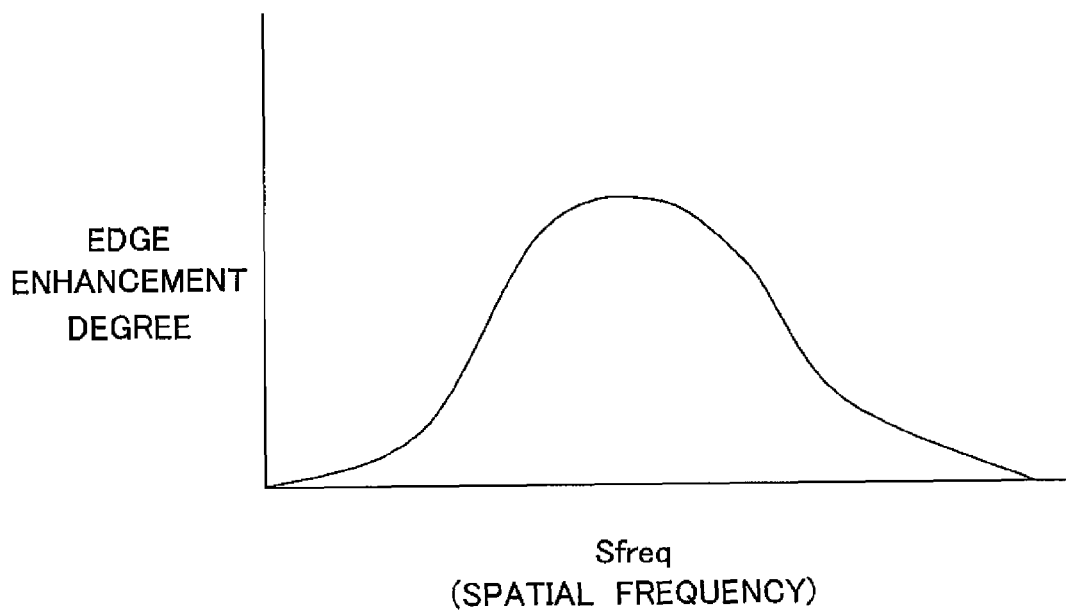
FIG. 15 is a diagram for concretely explaining MTF correction processing in a processing device according to the present embodiment.
Figure 16:
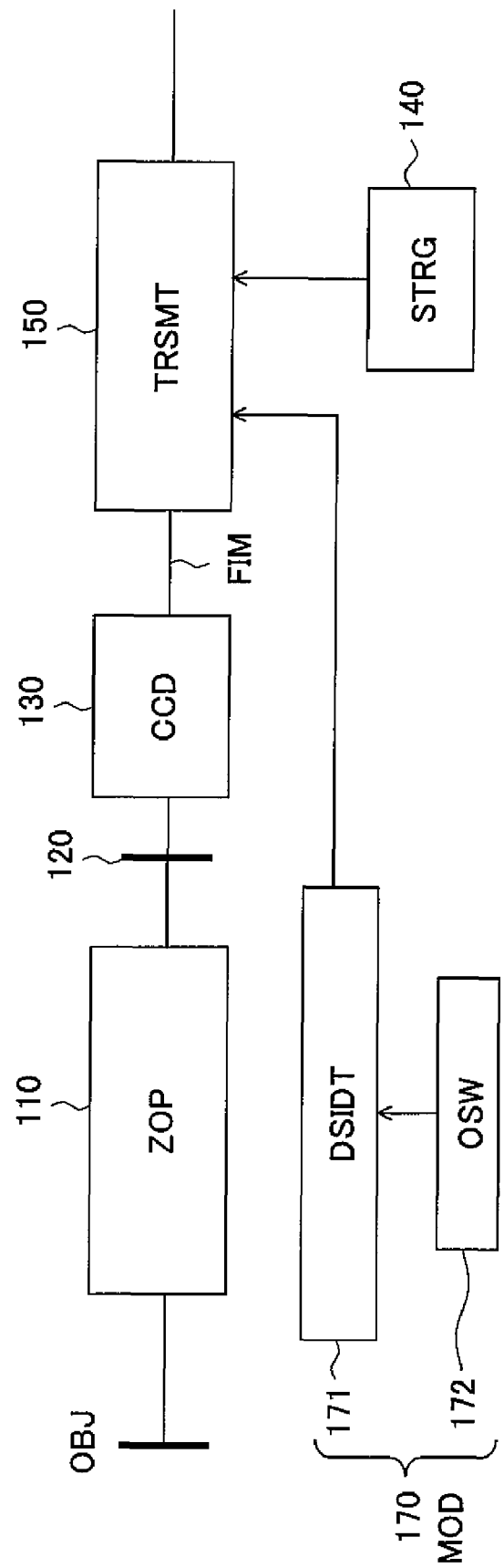
FIG. 16 is a block diagram showing another example of the imaging apparatus according to the present embodiment.

For example, in the case of the MTF characteristic of FIG. 14, the curve of the edge enhancement degree with respect to the spatial frequency Sfreq becomes as shown in FIG. 15.

Namely, by performing the correction by weakening the edge enhancement on the low frequency side and high frequency side within a predetermined bandwidth of the spatial frequency Sfreq and strengthening the edge enhancement in an intermediate frequency zone, the desired MTF characteristic curve B is virtually realized.

In this way, the imaging system 10 according to the embodiment is an image forming system having a plurality of imaging apparatuses 100 including optical systems 110 for forming the first order images and the processing device 200 for forming the first order image to a high definition final image, wherein the optical system is newly provided with a wavefront forming optical element or is provided with a glass, plastic, or other optical element with a surface shaped for wavefront forming use so as to deform the wavefront of the image formed, such a wavefront is imaged onto the imaging surface (light receiving surface) of the imaging element 130 formed by a CCD or CMOS sensor, and the imaged first order image is passed through the processing device 200 to obtain the high definition image.

In the present embodiment, the first order image from the imaging apparatus 100 is given light beam conditions with very deep depth. For this reason, the MTF of the first order image inherently becomes a low value, and the MTF thereof is corrected by the processing device 200.

Here, the process of image formation in the imaging apparatus 100 of the present embodiment will be considered in terms of wave optics.

A spherical wave scattered from one point of an object point becomes a converged wave after passing through the imaging optical system. At that time, when the imaging optical system is not an ideal optical system, aberration occurs. The wavefront becomes not spherical, but a complex shape. Geometric optics and wave optics are bridged by wavefront optics. This is convenient in the case where a wavefront phenomenon is handled.

When handling a wave optical MTF on an imaging plane, the wavefront information at an exit pupil position of the imaging optical system becomes important.

The MTF is calculated by a Fourier transform of the wave optical intensity distribution at the imaging point. The wave optical intensity distribution is obtained by squaring the wave optical amplitude distribution. That wave optical amplitude distribution is found from a Fourier transform of a pupil function at the exit pupil.

Further, the pupil function is the wavefront information (wavefront aberration) at the exit pupil position, therefore if the wavefront aberration can be strictly calculated as a numerical value through the optical system 110, the MTF can be calculated.

Accordingly, if processing the wavefront information at the exit pupil position in various ways by a predetermined technique, the MTF value on the imaging plane can be freely changed.

In the present embodiment as well, the shape of the wavefront is mainly changed by a wavefront forming optical element. It is truly the phase (length of light path along the rays) that is increased or decreased to form the desired wavefront.

Then, when forming the target wavefront, the light beams from the exit pupil are formed by a dense ray portion and a sparse ray portion as seen from the geometric optical spot images shown in FIG. 12A to FIG. 12C.

The MTF of this state of light beams exhibits a low value at a position where the spatial frequency is low and somehow maintains the resolution up to the position where the spatial frequency is high.

Namely, if this low MTF value (or, geometric optically, the state of the spot image), the phenomenon of aliasing will not be caused.

That is, a low pass filter is not necessary.

Further, the flare-like image causing a drop in the MTF value may be eliminated by the image processing device 200 configured by the later stage DSP etc. Due to this, the MTF value is remarkably improved.

As explained above, according to the present embodiment, the system has a plurality of imaging apparatuses 100A to 100C each having an optical system 110, a phase plate 120 as the optical wavefront modulation element, an imaging element 130 able to capture an object aberration image passing through the optical system 110 and phase plate 120, an imaging apparatus side storage portion 140 for storing coefficient specifying information for specifying a convolution coefficient, and a transmission device 150 for transmitting the object aberration image data obtained from the imaging element 130 and the coefficient specifying information stored in the storage portion 140 as principal components, and a processing device 200 for acquiring one coefficient from among a plurality of convolution coefficients stored in advance based on the coefficient specifying information in accordance with the zoom position or zoom amount transmitted from the imaging apparatus 100 and generating a dispersion-free object image data from the dispersed image signal from the imaging element 130, therefore the image restoration of a plurality of optical systems can be carried out by one apparatus.

Here, the imaging apparatuses 100A to 100C select adequate coefficient specifying information in accordance with their zoom positions or zoom amounts and perform transmissions.

Further, the lenses can be designed without regard as to the zoom position, and the image can be restored by good precision convolution. Accordingly, there are the advantages that any type of zoom lens can provide a focused image without requiring an optical lens high in difficulty, high in cost, and large in size and without driving a lens.

Further, the imaging apparatus 100 according to the present embodiment can be used for the WFCO of a zoom lens designed considering small size, light weight, and cost in a digital camera, camcorder, or other consumer electronic device.

Here, the imaging apparatuses 100A to 100C may select coefficient specifying information in accordance with the phase plate from the storage portion 140 and transmit the same to the processing device 200 and, at the same time, transmit the zoom information in accordance with the zoom position or zoom amount of each imaging apparatus to the processing device 200 by using the transmission device 150 in the same way. In this case, the processing device 200 acquires one convolution coefficient from the received coefficient specifying information and zoom information and restores the image.

Further, in the present embodiment, since the system has the imaging apparatus 100 having the wavefront forming optical element for deforming the wavefront of the image formed on the light receiving surface of the imaging element 130 by the imaging lens 112 and the processing device 200 for receiving the first order image FIM by the imaging apparatus 100 and applying predetermined correction processing etc. to boost the MTF at the spatial frequency of the first order image and form the high definition final image FNLIM, there is the advantage that acquisition of high definition image quality becomes possible.

Further, the configuration of the optical system 110 of the imaging apparatus 100 can be simplified, production becomes easy, and the cost can be reduced.

When using a CCD or CMOS sensor as the imaging element, there is a resolution limit determined from the pixel pitch. It is a known fact that when the resolution of the optical system is over that limit resolution, the phenomenon of aliasing occurs and exerts an adverse influence upon the final image.

For the improvement of the image quality, desirably the contrast is raised as much as possible, but this requires a high performance lens system.

However, as explained above, when using a CCD or CMOS sensor as the imaging element, aliasing occurs.

At present, in order to avoid the occurrence of aliasing, the imaging lens system jointly uses a low pass filter made of a uniaxial crystalline system to thereby avoid the phenomenon of aliasing.

The joint usage of the low pass filter in this way is correct in terms of principle, but the low pass filter per se is made of crystal, therefore is expensive and hard to manage. Further, there is the disadvantage that the optical system is more complicated due to the use in the optical system.

As described above, a higher definition image quality is demanded as a trend of the times. In order to form a high definition image, the optical system in a conventional imaging lens device must be made more complicated. If it is complicated, production becomes difficult. Also, the utilization of the expensive low pass filters leads to an increase in the cost.

However, according to the present embodiment, the occurrence of the phenomenon of aliasing can be avoided without using a low pass filter, and it becomes possible to obtain a high definition image quality.

Note that, in the present embodiment, the example of arranging the wavefront forming optical element of the optical system 110 on the object side from the stop was shown, but functional effects the same as those described above can be obtained even by arranging the wavefront forming optical element at a position the same as the position of the stop or on the imaging lens side from the stop.

Further, the lenses configuring the optical system 110 are not limited to the example of FIG. 5. In the present invention, various aspects are possible.

Figure 17:
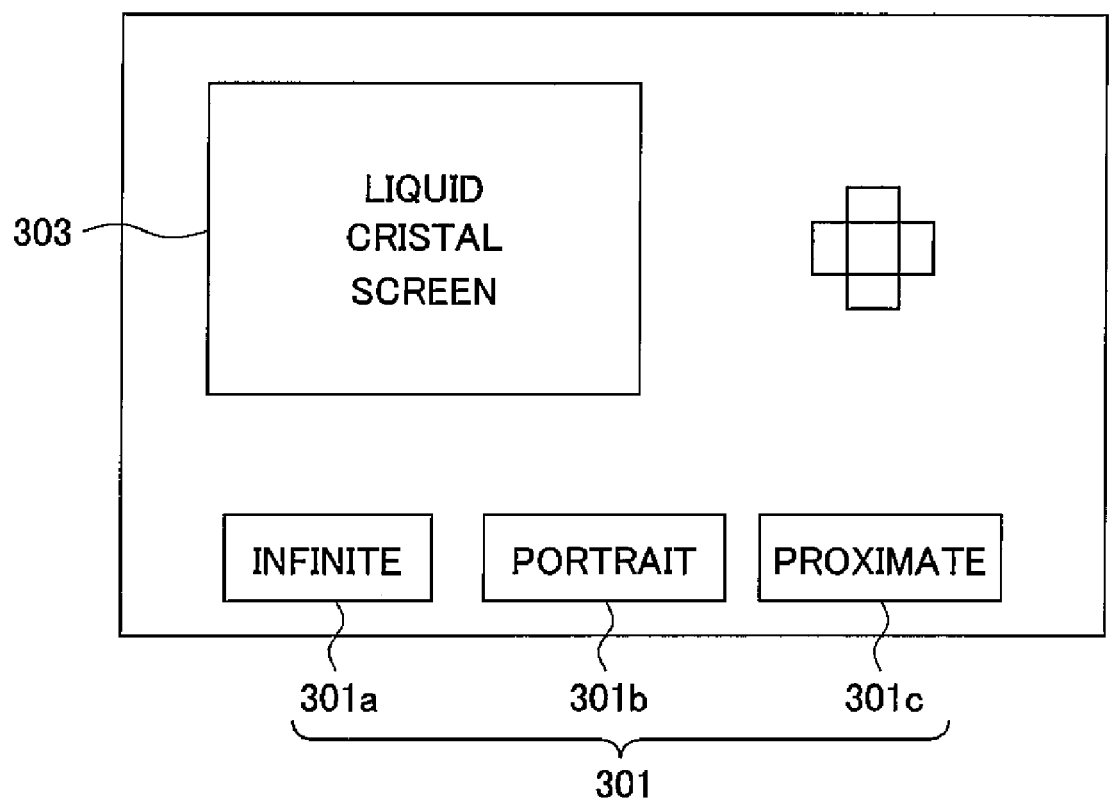
FIG. 17 is a diagram showing an example of the configuration of operation switches of FIG. 16.

Note that, in the above embodiment, an explanation was given by taking as an example the case where the imaging apparatus 100 was provided with the zoom amount detection device using FIG. 4 as an example, but also a configuration providing, for example as shown in FIG. 17, an imaging mode setting portion (MOD) 170 including an object schematic distance information detection device (DSIDT) 171 and operation switches (OSW) 172 and selecting the specific information based on the distance information is possible.

In this case, the apparatus has a plurality of imaging modes, for example, a macro imaging mode (proximate) and the distant view imaging mode (infinitely distant) other than the normal imaging mode (portrait) and is configured so that these imaging modes can be selected and input by the operation switches 172 of the imaging mode setting portion 170.

The operation switches 172 include for example selection switches 301a, 301b, and 301c provided on the bottom side of a liquid crystal screen 303 on the back surface of the camera (imaging apparatus) for example as shown in FIG. 17.

The selection switch 301a is a switch for selecting and inputting the distant view imaging mode (infinitely distant), the selection switch 301b is a switch for selecting and inputting the normal imaging mode (portrait), and the selection switch 301c is a switch for selecting and inputting the macro imaging mode (proximate).

Note that the switching method of the mode, other than the method using switches as in FIG. 17, may be a touch panel method, and the mode for switching the object distance from the menu screen may be selected.

The object schematic distance information detection device 171 as the object distance information generation portion generates the information corresponding to the distance up to the object according to the input information of the operation switches 172 and supplies the same to the transmission device 150.

The processing device 200 performs processing for converting a dispersed image signal from the imaging element 130 of the imaging apparatus 100 to a dispersion-free image signal based on the transmission information of the transmission device 150. At this time, it receives the coefficient specifying information selected in accordance with the detection result of the object schematic distance information detection device 171 and performs different conversion processing in accordance with the set imaging mode.

For example, the processing device 200 selectively executes normal conversion processing in the normal imaging mode, macro conversion processing corresponding to the macro imaging mode for reducing the aberration on the proximate side in comparison with this normal conversion processing, and distant view conversion processing corresponding to the distant view imaging mode for reducing the aberration on the distant side in comparison with the normal conversion processing in accordance with the imaging mode.

Here, the imaging apparatuses 100A to 100C may transmit coefficient specifying information in accordance with their phase plates and, at the same time, transmit the information corresponding to the distance up to the object, and the processing device 200 may acquire one convolution coefficient from these two types of information and restore the image.

Also in this case, effects the same as the above effects can be obtained.

Further, in the above embodiment, an explanation was given by taking as an example providing a zoom amount detection device and object schematic distance information detection device, but a form not provided with these may be employed as well. In this case, in FIG. 3, based on only the coefficient specifying information transmitted from the imaging apparatus 100, one coefficient is acquired from among convolution coefficients stored in advance in the processing device 200, and the dispersion-free object image data is generated. Also in this case, effects the same as the above effects can be obtained.

Figure 18:
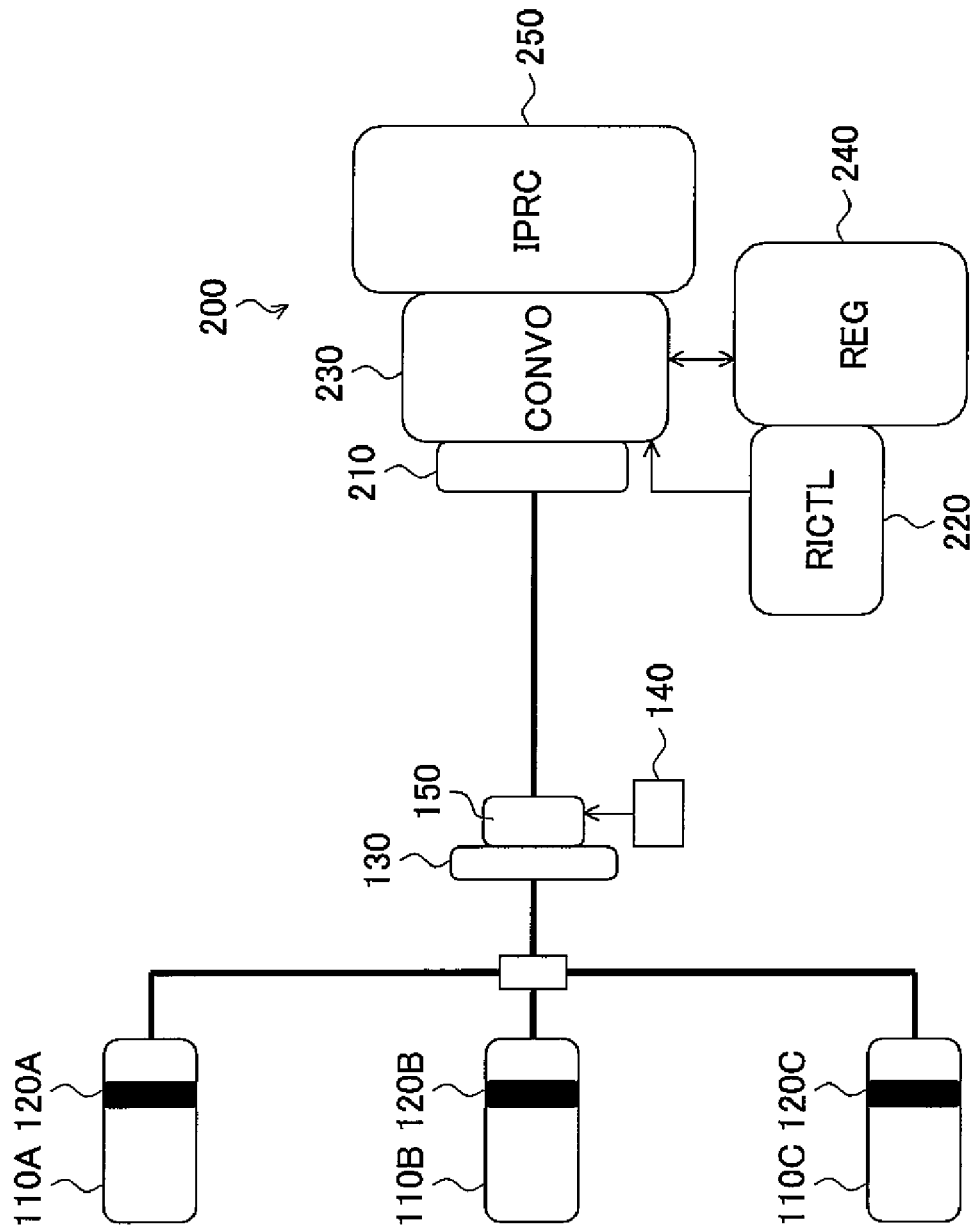
FIG. 18 is a view of the configuration showing another example of an imaging system.

Further, in the present embodiment, a plurality of optical systems were provided, and captured image information thereof was transmitted together with the coefficient specifying information to the processing device 200 side, but for example as shown in FIG. 18, also a configuration providing a plurality of optical systems 110-1 and 110-2, sequentially selecting desired optical systems, and inputting the object image passing through optical systems to the single imaging element 130 is possible.

Also in this case, effects the same as the above effects can be obtained.

INDUSTRIAL APPLICABILITY

In an imaging apparatus, imaging system, and imaging method of the present invention, images by a plurality of optical systems can be restored by one apparatus, therefore they can be applied to a digital still camera, a camera mounted in a mobile phone, a camera mounted in a personal digital assistant, and so on provided with a zoom optical system.

The invention claimed is:

1. An imaging system comprising:
an imaging apparatus and
a processing device, wherein
the imaging apparatus includes
an imaging element able to capture an object aberration dispersed image passing through an optical system and an optical wavefront modulation element which disperses the image and the dispersed image being not focused anywhere on the imaging element,
a convolution coefficient specifying information providing portion providing coefficient specifying information for specifying the convolution coefficient, and
a transmission portion transmitting object aberration dispersed image data obtained from the imaging element and the coefficient specifying information provided by the convolution coefficient specifying information providing portion, and
the processing device includes
a reception portion receiving the object aberration dispersed image data and the coefficient specifying information transmitted by the transmission portion of the imaging apparatus,
a processing device side storage portion storing a plurality of convolution coefficients,
a coefficient selection portion selecting one convolution coefficient from the processing device side storage portion based on the coefficient specifying information received by the reception portion, and
a conversion portion generating the aberration-free-and-dispersion-free object image by converting the object aberration dispersed image data received by the reception portion by the one convolution coefficient selected at the coefficient selection portion.

2. An imaging system as set forth in claim 1, wherein the convolution coefficient specifying information providing portion includes an imaging apparatus side storage portion storing coefficient specifying information for specifying the convolution coefficient, and the transmission portion transmits the object aberration dispersed image data obtained from the imaging element and the coefficient specifying information stored in the storage portion.

3. An imaging system comprising
an imaging apparatus and
a processing device, wherein
the imaging apparatus includes an imaging element able to capture an object aberration image passing through an optical system and an optical wavefront modulation element,
a convolution coefficient specifying information providing portion providing coefficient specifying information for specifying the convolution coefficient, and
a transmission portion transmitting object aberration image data obtained from the imaging element and the coefficient specifying information provided by the convolution coefficient specifying information providing portion, and
the processing device includes
a reception portion receiving the object aberration image data and the coefficient specifying information transmitted by the transmission portion of the imaging apparatus,
a processing device side storage portion storing a plurality of convolution coefficients,
a coefficient selection portion selecting one convolution coefficient from the processing device side storage portion based on the coefficient specifying information received by the reception portion, and
a conversion portion generating object image data free from aberration by converting the object aberration image data received by the reception portion by the one convolution coefficient selected at the coefficient selection portion, wherein,
in the imaging apparatus,
the optical system can selectively mount a plurality of lenses,
the convolution coefficient specifying information providing portion includes a coefficient specifying information acquisition portion acquiring coefficient specifying information for specifying the convolution coefficient in accordance with the mounted lens, and
the imaging element can capture an object aberration image passing through at least one lens among the plurality of lenses and the optical wavefront modulation element, and
the transmission portion transmits the object aberration image data obtained from the imaging element and the coefficient specifying information acquired by the coefficient specifying information acquisition portion.

4. An imaging system comprising
an imaging apparatus and
a processing device, wherein
the imaging apparatus includes
an imaging element able to capture an object aberration image passing through an optical system and an optical wavefront modulation element,
a convolution coefficient specifying information providing portion providing coefficient specifying information for specifying the convolution coefficient, and
a transmission portion transmitting object aberration image data obtained from the imaging element and the coefficient specifying information provided by the convolution coefficient specifying information providing portion, and
the processing device includes
a reception portion receiving the object aberration image data and the coefficient specifying information transmitted by the transmission portion of the imaging apparatus,
a processing device side storage portion storing a plurality of convolution coefficients,
a coefficient selection portion selecting one convolution coefficient from the processing device side storage portion based on the coefficient specifying information received by the reception portion, and
a conversion portion generating object image data free from aberration by converting the object aberration image data received by the reception portion by the one convolution coefficient selected at the coefficient selection portion, wherein,
in the imaging apparatus,
the optical system includes a zoom optical system,
the convolution coefficient specifying information providing portion includes
an imaging apparatus side storage portion storing a plurality of coefficient specifying information able to specify the convolution coefficient in accordance with the zoom amount of the zoom optical system,
a zoom amount detection portion detecting the zoom amount of the zoom optical system, and
a coefficient specifying information acquisition portion acquiring one coefficient specifying information from the imaging apparatus side storage portion based on the zoom amount detected by the zoom amount detection portion,
the imaging element can capture an object aberration image passing through the zoom optical system and the optical wavefront modulation element, and
the transmission portion transmits the object aberration image data obtained from the imaging element and the coefficient specifying information acquired by the coefficient specifying information acquisition portion.

5. An imaging system comprising
an imaging apparatus and
a processing device, wherein
the imaging apparatus includes
an imaging element able to capture an object aberration image passing through an optical system and an optical wavefront modulation element,
a convolution coefficient specifying information providing portion providing coefficient specifying information for specifying the convolution coefficient, and
a transmission portion transmitting object aberration image data obtained from the imaging element and the coefficient specifying information provided by the convolution coefficient specifying information providing portion, and
the processing device includes
a reception portion receiving the object aberration image data and the coefficient specifying information transmitted by the transmission portion of the imaging apparatus,
a processing device side storage portion storing a plurality of convolution coefficients,
a coefficient selection portion selecting one convolution coefficient from the processing device side storage portion based on the coefficient specifying information received by the reception portion, and
a conversion portion generating object image data free from aberration by converting the object aberration image data received by the reception portion by the one convolution coefficient selected at the coefficient selection portion, wherein the convolution coefficient specifying information providing portion includes an object distance information acquisition portion acquiring information corresponding to a distance up to the object, an imaging apparatus side storage portion storing a plurality of coefficient specifying information able to specify the convolution coefficient in accordance with the distance up to the object, and a coefficient specifying information acquisition portion acquiring one coefficient specifying information from the imaging apparatus side storage portion based on the information corresponding to the distance up to the object acquired by the object distance information acquisition portion, and the transmission portion transmits the object aberration image data obtained from the imaging element and the coefficient specifying information acquired by the coefficient specifying information acquisition portion.

6. An imaging apparatus including an imaging element able to capture an object aberration dispersed image passing through an optical system and an optical wavefront modulation element which disperses the image and the dispersed image being not focused anywhere on the imaging element, a convolution coefficient specifying information providing portion providing coefficient specifying information for specifying the convolution coefficient, and a transmission portion transmitting object aberration dispersed image data obtained from the imaging element and the coefficient specifying information provided by the convolution coefficient specifying information providing portion.

7. An imaging apparatus as set forth in claim 6, wherein the convolution coefficient specifying information providing portion includes an imaging apparatus side storage portion storing coefficient specifying information for specifying the convolution coefficient, and the transmission portion transmits the object aberration dispersed image data obtained from the imaging element and the coefficient specifying information stored in the storage portion.

8. An imaging apparatus including an imaging element able to capture an object aberration image passing through an optical system and an optical wavefront modulation element, a convolution coefficient specifying information providing portion providing coefficient specifying information for specifying the convolution coefficient, and a transmission portion transmitting object aberration image data obtained from the imaging element and the coefficient specifying information provided by the convolution coefficient specifying information providing portion, wherein the optical system can selectively mount a plurality of lenses, the convolution coefficient specifying information providing portion includes a coefficient specifying information acquisition portion acquiring coefficient specifying information for specifying the convolution coefficient in accordance with the mounted lens, and the imaging element can capture an object aberration image passing through at least one lens among the plurality of lenses and the optical wavefront modulation element, and the transmission portion transmits the object aberration image data obtained from the imaging element and the coefficient specifying information acquired by the coefficient specifying information acquisition portion.

9. An imaging apparatus including an imaging element able to capture an object aberration image passing through an optical system and an optical wavefront modulation element, a convolution coefficient specifying information providing portion providing coefficient specifying information for specifying the convolution coefficient, and a transmission portion transmitting object aberration image data obtained from the imaging element and the coefficient specifying information provided by the convolution coefficient specifying information providing portion, wherein the optical system includes a zoom optical system, the convolution coefficient specifying information providing portion includes an imaging apparatus side storage portion storing a plurality of coefficient specifying information able to specify the convolution coefficient in accordance with the zoom amount of the zoom optical system, a zoom amount detection portion detecting the zoom amount of the zoom optical system, and a coefficient specifying information acquisition portion acquiring one coefficient specifying information from the imaging apparatus side storage portion based on the zoom amount detected by the zoom amount detection portion, the imaging element can capture an object aberration image passing through the zoom optical system and the optical wavefront modulation element, and the transmission portion transmits the object aberration image data obtained from the imaging element and the coefficient specifying information acquired by the coefficient specifying information acquisition portion.

10. An imaging apparatus including an imaging element able to capture an object aberration image passing through an optical system and an optical wavefront modulation element, a convolution coefficient specifying information providing portion providing coefficient specifying information for specifying the convolution coefficient, and a transmission portion transmitting object aberration image data obtained from the imaging element and the coefficient specifying information provided by the convolution coefficient specifying information providing portion, wherein the convolution coefficient specifying information providing portion includes an object distance information acquisition portion acquiring information corresponding to a distance up to the object, an imaging apparatus side storage portion storing a plurality of coefficient specifying information able to specify the convolution coefficient in accordance with the distance up to the object, and a coefficient specifying information acquisition portion acquiring one coefficient specifying information from the imaging apparatus side storage portion based on the information corresponding to the distance up to the object acquired by the object distance information acquisition portion, and the transmission portion transmits the object aberration image data obtained from the imaging element and the coefficient specifying information acquired by the coefficient specifying information acquisition portion.

11. An imaging method including a step of capturing an object aberration dispersed image by an imaging element passing through an optical system and an optical wavefront modulation element by an imaging element which disperses the image and the dispersed image being not focused anywhere on the imaging element, a step of transmitting object aberration dispersed image data and coefficient specifying information for specifying a convolution coefficient, a step of receiving the transmitted object aberration dispersed image data and the coefficient specifying information, a coefficient selection step of selecting one convolution coefficient from among a plurality of convolution coefficients based on the received coefficient specifying information, and a step of generating the aberration-and-dispersion-free object image data by converting the received object aberration dispersed image data by the one convolution coefficient selected in the coefficient selection step.

* * * * *